United States Patent Office.

ALFRED WOHL, OF BERLIN, GERMANY.

PROCESS OF MAKING ACETYL CHLORID.

SPECIFICATION forming part of Letters Patent No. 710,648, dated October 7, 1902.

Application filed July 11, 1902. Serial No. 115,233. (No specimens.)

*To all whom it may concern:*

Be it known that I, ALFRED WOHL, professor, a subject of the Emperor of Germany, residing at Berlin, Germany, (and whose post-office address is 49 Bleibtreustrasse, Charlottenburg, Berlin, Germany,) have invented certain new and useful Improvements in the Manufacture of Acetyl Chlorids, (for which I have applied for a patent in Germany on the 17th of January, 1901, and in Great Britain on the 20th of June, 1902,) of which the following is a specification.

The manufacture of acid chlorids, such as acetyl chlorid, from acetic acid or sodium acetate by the usual method by means of phosphoric chlorid or of phosgene offers great difficulties and is expensive. On the other hand, the method of producing acetyl chlorid by mixing calcium acetate with sulfuryl chlorid and subsequent distillation has the defect that it utilizes the sulfuryl chlorid and the acetate of lime very imperfectly, in consequence of which the yield is unfavorable.

I have found that the mutual decomposition of calcium acetate and sulfuryl chlorid may be effected approximately in the desired manner and a much higher yield of acetyl chlorid obtained by subjecting the said raw materials or components to a prolonged grinding process at ordinary or at slightly-higher than ordinary temperature.

The special effect of the mechanical treatment is based on the fact that by bringing acetate of lime together with sulfuryl chlorid a double compound is first produced, and the conversion into acetyl chlorid and calcium sulfate takes place only gradually when the intermediate product consisting of the double compound is continually brought into intimate contact with the remainder of the acetate of lime. An ordinary mixing apparatus would not produce this effect. The apparatus must have a mechanical disentegrating action, as is the case, for instance, with an edge runner or a ball-mill. The correctness of this conclusion will be apparent from the following consideration: After grinding in the ball-mill for about half an hour less than twenty per cent. of the theoretical quantity of acetyl chlorid has been produced. For instance, if thirty grams of pure calcium acetate are ground with thirty grams (equal to eighteen cubic centimeters) of sulfuryl chlorid for half an hour and the product is then subjected to distillation the distillate up to a temperature of 60° centigrade amounts to only six grams instead of the theoretical quantity of thirty grams. Afterward the thermometer rises rapidly until the temperature approaches 110°, so that only insignificant quantities of unaltered sulfuryl chlorid can remain in the still, and if the distillation is continued a distillate boiling between 110° and 124° centigrade is obtained simultaneously with the carbonization of the residue, which distillate probably consists of a mixture of acetic acid and acetic anhydrid contaminated with sulfur compounds. It follows that the mutual decomposition produced by heating takes a different course, which does not yield any acetyl chlorid in addition to that which has already been formed.

If the product of the reaction obtained in the ball-mill by grinding for about half an hour, as mentioned above, is allowed to remain in a closed vessel for about two days and then subjected to distillation, the same result is obtained as when the distillation takes place immediately after the removal of the said product from the ball-mill. After two hours of grinding about thirty per cent. of the acetyl chlorid has been produced. If, however, the material is ground in the ball-mill from eight to ten hours (instead of two hours) and then subjected to distillation immediately or after prolonged storage, more than eighty per cent. of the theoretical quantity is obtained under 60° centigrade. These facts show that the mechanical treatment described above is necessary for controlling the further decomposition so as to form acetyl chlorid and that the chemical reaction which takes place when acetate of lime is mixed with sulfuryl chlorid is essentially different from that described in the German patent specification No. 63,593.

As far as I am aware the present process is the only one by means of which acetyl chlorid can be obtained from gray calcium acetate (or pyrolignite of lime) on a commercial scale.

Example: One hundred kilos of sharply-dried gray calcium acetate of about eighty per cent. strength are introduced into a closed ball-mill and fifty liters of sulfuryl chlorid are admitted so slowly that the heat will not exceed the desired limit. Subsequently the mass is ground, the duration of the grinding process depending partly on the dimensions of the ball-mill or of the active grinding-surface and may be shortened by using very little of the substance to be ground.

Instead of admitting to the apparatus the finished sulfuryl chlorid the material may be caused to act in a nascent state—for instance, by admitting chlorin and an excess of sulfurous acid.

When the ball-mill has done its work, it may be emptied and the mass subjected to extraction with hydrocarbon or other suitable solvent, or the material may be distilled directly out of the ball-mill, which may be stopped for this purpose. The acetyl chlorid driven out of the still may pass through a dephlegmator for separating it from any excess of sulfuryl chlorid or from any small admixture of acetic anhydrid.

Similar results may be obtained if an acetate of another alkaline earth, such as barium acetate, is used as a raw material instead of the calcium acetate.

What I claim is—

1. The improvement in the manufacture of acetyl chlorid from the product obtained by mixing an acetate of an alkaline earth with sulfuryl chlorid, which consists in subjecting the said product to prolonged mechanical disintegration before extracting the acetyl chlorid, substantially as described.

2. The improvement in the manufacture of acetyl chlorid from the product obtained by mixing calcium acetate with sulfuryl chlorid, which consists in subjecting the said product to a combined mechanical mixing and disintegrating process, before distilling off the acetyl chlorid, substantially as described.

3. The process for obtaining acetyl chlorid which consists in thoroughly grinding together a mixture of calcium acetate and sulfuryl chlorid, and subjecting the product to distillation, substantially as described.

In witness whereof I have hereunto signed my name in the presence of two subscribing witnesses.

ALFRED WOHL.

Witnesses:
HENRY HASPER,
WOLDEMAR HAUPT.